(12) United States Patent
Thottappilly et al.

(10) Patent No.: US 12,517,760 B1
(45) Date of Patent: Jan. 6, 2026

(54) TECHNIQUES FOR DISCARDING GRAPHICS WORK FOR QUALITY OF SERVICE

(71) Applicant: Apple Inc., Cupertino, CA (US)

(72) Inventors: Arjun Thottappilly, Oviedo, FL (US); Frank W. Liljeros, Sanford, FL (US); Andrew M. Havlir, Orlando, FL (US); Benjamin Bowman, London (GB)

(73) Assignee: Apple Inc., Cupertino, CA (US)

( * ) Notice: Subject to any disclaimer, the term of this patent is extended or adjusted under 35 U.S.C. 154(b) by 563 days.

(21) Appl. No.: 18/049,689

(22) Filed: Oct. 26, 2022

Related U.S. Application Data

(60) Provisional application No. 63/376,342, filed on Sep. 20, 2022.

(51) Int. Cl.
*G06F 9/50* (2006.01)
*G06T 1/00* (2006.01)
*G06T 1/60* (2006.01)

(52) U.S. Cl.
CPC ............ *G06F 9/5022* (2013.01); *G06F 9/50* (2013.01); *G06F 9/5005* (2013.01); *G06F 9/5011* (2013.01); *G06F 9/5061* (2013.01); *G06F 9/5077* (2013.01); *G06T 1/00* (2013.01); *G06T 1/60* (2013.01)

(58) Field of Classification Search
CPC ........ G06F 9/50; G06F 9/5005; G06F 9/5011; G06F 9/5022; G06F 9/5061; G06F 9/5077; G06T 1/00; G06T 1/60
See application file for complete search history.

(56) References Cited

U.S. PATENT DOCUMENTS

| | | | | |
|---|---|---|---|---|
| 7,774,585 | B2 * | 8/2010 | Ober | G06F 9/462 |
| | | | | 712/244 |
| 8,564,616 | B1 * | 10/2013 | Hakura | G09G 5/363 |
| | | | | 345/620 |
| 9,161,034 | B2 | 10/2015 | Ober et al. | |
| 10,089,264 | B2 | 10/2018 | Chew | |
| 2007/0103474 | A1 * | 5/2007 | Huang | G06T 1/20 |
| | | | | 345/506 |
| 2014/0204106 | A1 * | 7/2014 | Hakura | G06T 1/60 |
| | | | | 345/543 |
| 2018/0107524 | A1 * | 4/2018 | Fong | G06F 9/5061 |
| 2018/0349146 | A1 * | 12/2018 | Iwamoto | G06F 9/461 |
| 2022/0197811 | A1 * | 6/2022 | Ganguly | G06F 13/16 |
| 2023/0206559 | A1 * | 6/2023 | Brennan | G06T 15/005 |
| | | | | 345/418 |

\* cited by examiner

*Primary Examiner* — Charles M Swift
(74) *Attorney, Agent, or Firm* — Kowert, Hood, Munyon, Rankin & Goetzel, P.C.; Michael B. Davis; Dean M. Munyon

(57) ABSTRACT

Techniques are disclosed relating to discarding graphics work, e.g., to free execution resources for higher-priority work. Control circuitry may distribute a first set of graphics work to a set of graphics processor sub-units and initiate a priority inversion signal in response to a determination that a second set of graphics work has a higher priority than the first set of graphics work and is blocked by the first set of graphics work. In response to a discard signal, control circuitry may discard results of the first set of graphics work from the multiple distributed hardware slots, including to: free one or more memory pages written to by the first set of graphics work and provide a stand-in memory page.

20 Claims, 11 Drawing Sheets

TECHNIQUES FOR DISCARDING GRAPHICS WORK FOR QUALITY OF SERVICE

The present application claims priority to U.S. Provisional Application No. 63/376,342, filed Sep. 20, 2022, the disclosure of which is incorporated by reference herein in its entirety.

BACKGROUND

Technical Field

This disclosure relates generally to graphics processors and more particularly to discarding graphics work to free execution resources for higher-priority work.

Description of the Related Art

Graphics processors typically operate on groups of graphics work which may be referred to as "kicks." For compute work, the kick may include multiple compute kernels, which may in turn include sets of threads for single-instruction multiple-data execution. For vertex or pixel work, the kick may include shader programs to be run on sets of nearby vertices or pixels. In hardware, a set of configuration registers may be programmed with information to configure processing resources for the duration of a kick.

Graphics processors typically use command queues to store received graphics work. Queue entries may be used for kicks/kernels to be executed by the GPU. A given application may create one or more command queues (similar to threads) and command queues may be maintained for multiple applications at the same time.

Software or hardware may assign priority values to command queues (and items in command queues may derive their priority from their command queue). In other implementations, items may be assigned individual priorities directly.

In distributed GPU systems with multiple replicated portions (e.g., shader cores), work from a given command queue item may be distributed across multiple portions of the GPU (referred to as mGPUs). In some scenarios, higher priority work may be blocked by lower priority work that has already been distributed. This scenario may be referred to as priority inversion.

DETAILED DESCRIPTION

Figure 1A:
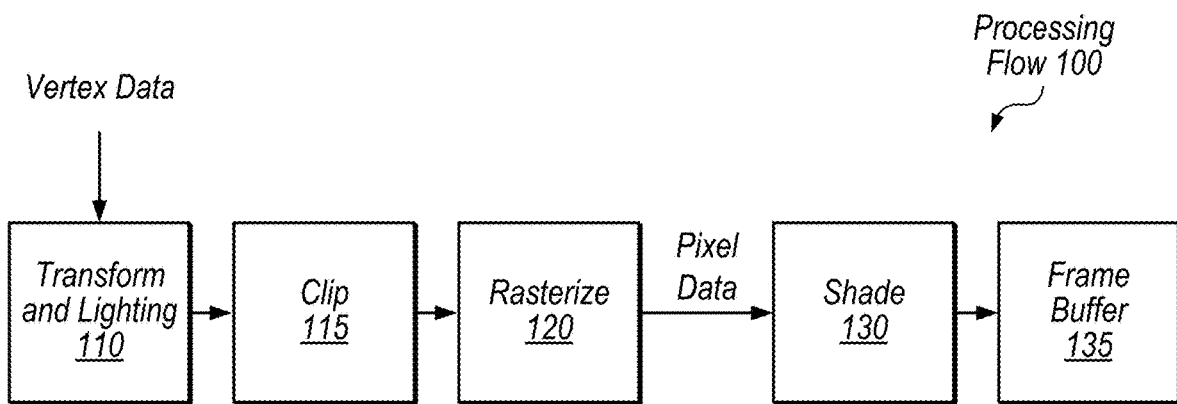
FIG. 1A is a diagram illustrating an overview of example graphics processing operations, according to some embodiments.

In disclosed embodiments, hardware may signal to software (e.g., a graphics driver) when higher-priority work is being blocked by lower-priority work. The driver may context-switch out the lower-priority work, or may choose to discard/kill the lower-priority work (e.g., immediately, or if a context-switch takes more than a threshold amount of time).

Multiple "kicks" may be executed to render a frame of graphics data. In some embodiments, a kick is a unit of work from a single context that may include multiple threads to be executed (and may potentially include other types of graphics work that is not performed by a shader). A kick may not provide any assurances regarding memory synchronization among threads (other than specified by the threads themselves), concurrency among threads, or launch order among threads. In some embodiments, a kick may be identified as dependent on the results of another kick, which may allow memory synchronization without requiring hardware memory coherency support. Typically, graphics firmware or hardware programs configuration registers for each kick before sending the work to the pipeline for processing. Often, once a kick has started, it does not access a memory hierarchy past a certain level until the kick is finished (at which point results may be written to another level in the hierarchy). Information for a given kick may include state information, location of shader program(s) to execute, buffer information, location of texture data, available address spaces, etc. that are needed to complete the corresponding graphics operations. Graphics firmware or hardware may schedule kicks and detect an interrupt when a kick is complete, for example. In some embodiments, portions of a graphics unit are configured to work on a single kick at a time. This set of resources may be referred to as a "kickslot." Thus, in some embodiments, any data that is needed for a given kick is read from memory that is shared among multiple processing elements at the beginning of the kick and results are written back to shared memory at the end of the kick. Therefore, other hardware may not see the results of the kick until completion of the kick, at which point the results are available in shared memory and can be accessed by other kicks (including kicks from other data masters). A kick may include a set of one or more rendering commands, which may include a command to draw procedural geometry, a command to set a shadow sampling method, a command to draw meshes, a command to retrieve a texture, a command to perform generation computation, etc. A kick may be executed at one of various stages during the rendering of a frame. Examples of rendering stages include, without limitation: camera rendering, light rendering, projection, texturing, fragment shading, etc. Kicks may be scheduled for compute work, vertex work, or pixel work, for example.

As GPUs grow in size and capabilities, they may be designed in a distributed fashion with multiple GPU sub-units (mGPUs), which may be located on the same die or multiple dies. Logical kickslots may be defined, which are then mapped to physical hardware that executes the kicks. Further, work from a given virtual slot may be distributed across the entire GPU, or only a portion thereof. Thus, work from logical slots may be distributed to distributed circuitry in various patterns (and using different amounts of distributed slots such that some work is distributed across all mGPUs while some work targets a subset of mGPUs or a single mGPU).

The processor may maintain mapping information indicating which execution resources (e.g., hardware slots) have been assigned to a given kick. The processor may trigger an interrupt when it detects that lower-priority work is blocking higher-priority work (e.g., when there are not enough distributed slots available to schedule the higher-priority work, but there is lower priority work in some slots). The driver may use the mapping information and the interrupt to determine which kick(s) to discard/kill to make room for higher-priority work. Note that while logical slots are discussed herein, they are not intended to limit the scope of the present disclosure, rather disclosed techniques may be used with various other distribution schemes.

In the geometry processing context, a given geometry kick may use page manager circuitry (also referred to as parameter manager circuitry) to allocate and close memory pages used to store processing results. In the context where the geometry kick is discarded to make room for higher-priority work, the page manager circuitry may provide a stand-in page (which may also be referred to as a "dummy page") to shader hardware (where data from the stand-in page can later be thrown away) to allow the lower-priority work to drain without running out of memory. The page manager may also free any memory pages that have already been written for the kick.

Graphics Processing Overview

Referring to FIG. 1A, a flow diagram illustrating an example processing flow 100 for processing graphics data is shown. In some embodiments, transform and lighting procedure 110 may involve processing lighting information for vertices received from an application based on defined light source locations, reflectance, etc., assembling the vertices into polygons (e.g., triangles), and transforming the polygons to the correct size and orientation based on position in a three-dimensional space. Clip procedure 115 may involve discarding polygons or vertices that fall outside of a viewable area. In some embodiments, geometry processing may utilize object shaders and mesh shaders for flexibility and efficient processing prior to rasterization. Rasterize procedure 120 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer), ignoring one or more fragments (e.g., if they are covered by other objects), or both. Shade procedure 130 may involve altering pixel components based on lighting, shadows, bump mapping, translucency, etc. Shaded pixels may be assembled in a frame buffer 135. Modern GPUs typically include programmable shaders that allow customization of shading and other processing procedures by application developers. Thus, in various embodiments, the example elements of FIG. 1A may be performed in various orders, performed in parallel, or omitted. Additional processing procedures may also be implemented.

Figure 1B:
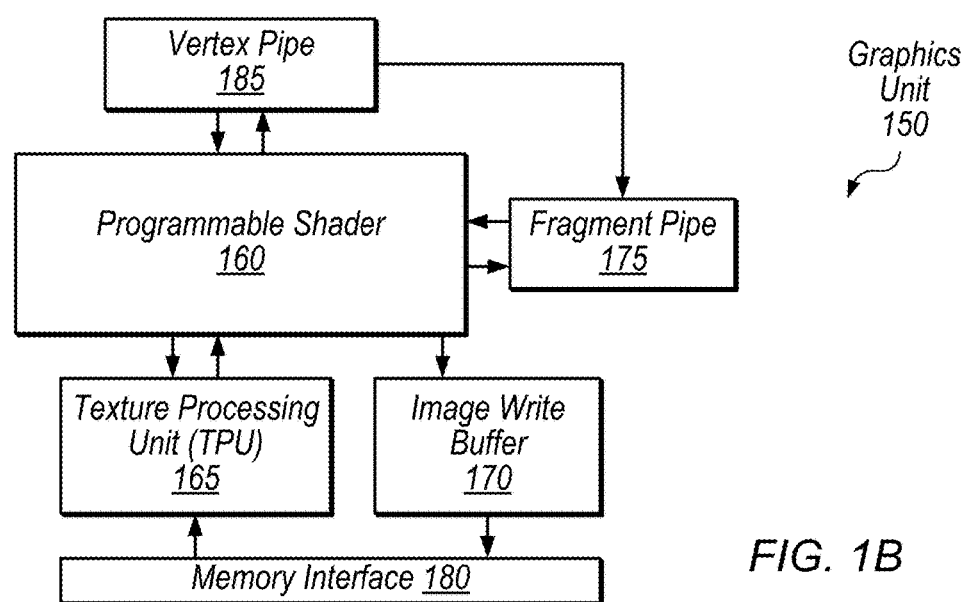
FIG. 1B is a block diagram illustrating an example graphics unit, according to some embodiments.

Referring now to FIG. 1B, a simplified block diagram illustrating a graphics unit 150 is shown, according to some embodiments. In the illustrated embodiment, graphics unit 150 includes programmable shader 160, vertex pipe 185, fragment pipe 175, texture processing unit (TPU) 165, image write buffer 170, and memory interface 180. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 or programmable shader 160 to generate fragment data. Vertex pipe 185 and fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and TPU 165. Programmable shader 160 may be configured to perform vertex processing tasks on vertex data which may include various transformations and adjustments of vertex data. Programmable shader 160, in the illustrated embodiment, is also configured to perform fragment processing tasks on pixel data such as texturing and shading, for example. Programmable shader 160 may include multiple sets of multiple execution pipelines for processing data in parallel.

In some embodiments, programmable shader includes pipelines configured to execute one or more different SIMD groups in parallel. Each pipeline may include various stages configured to perform operations in a given clock cycle, such as fetch, decode, issue, execute, etc. The concept of a processor "pipeline" is well understood, and refers to the concept of splitting the "work" a processor performs on instructions into multiple stages. In some embodiments, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction or operations associated with the instruction on to other stages for further processing.

The term "SIMD group" is intended to be interpreted according to its well-understood meaning, which includes a set of threads for which processing hardware processes the same instruction in parallel using different input data for the different threads. SIMD groups may also be referred to as SIMT (single-instruction, multiple-thread groups), single instruction parallel thread (SIPT), or lane-stacked threads. Various types of computer processors may include sets of pipelines configured to execute SIMD instructions. For example, graphics processors often include programmable shader cores that are configured to execute instructions for a set of related threads in a SIMD fashion. Other examples of names that may be used for a SIMD group include: a wavefront, a clique, or a warp. A SIMD group may be a part of a larger thread group, which may be broken up into a number of SIMD groups based on the parallel processing capabilities of a computer. In some embodiments, each thread is assigned to a hardware pipeline (which may be referred to as a "lane") that fetches operands for that thread and performs the specified operations in parallel with other pipelines for the set of threads. Note that processors may have a large number of pipelines such that multiple separate SIMD groups may also execute in parallel. In some embodiments, each thread has private operand storage, e.g., in a register file. Thus, a read of a particular register from the register file may provide the version of the register for each thread in a SIMD group.

As used herein, the term "thread" includes its well-understood meaning in the art and refers to sequence of program instructions that can be scheduled for execution independently of other threads. Multiple threads may be included in a SIMD group to execute in lock-step. Multiple threads may be included in a task or process (which may correspond to a computer program). Threads of a given task may or may not share resources such as registers and memory. Thus, context switches may or may not be performed when switching between threads of the same task.

In some embodiments, multiple programmable shader units 160 are included in a GPU. In these embodiments, global control circuitry may assign work to the different sub-portions of the GPU which may in turn assign work to shader cores to be processed by shader pipelines.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write buffer 170, in some embodiments, is configured to store processed tiles of an image and may perform operations to a rendered image before it is transferred for display or to memory for storage. In some embodiments, graphics unit 150 is configured to perform tile-based deferred rendering (TBDR). In tile-based rendering, different portions of the screen space (e.g., squares or rectangles of pixels) may be processed separately. Memory interface 180 may facilitate communications with one or more of various memory hierarchies in various embodiments.

As discussed above, graphics processors typically include specialized circuitry configured to perform certain graphics processing operations requested by a computing system. This may include fixed-function vertex processing circuitry, pixel processing circuitry, or texture sampling circuitry, for example. Graphics processors may also execute non-graphics compute tasks that may use GPU shader cores but may not use fixed-function graphics hardware. As one example, machine learning workloads (which may include inference, training, or both) are often assigned to GPUs because of their parallel processing capabilities. Thus, compute kernels executed by the GPU may include program instructions that specify machine learning tasks such as implementing neural network layers or other aspects of machine learning models to be executed by GPU shaders. In some scenarios, non-graphics workloads may also utilize specialized graphics circuitry, e.g., for a different purpose than originally intended.

Further, various circuitry and techniques discussed herein with reference to graphics processors may be implemented in other types of processors in other embodiments. Other types of processors may include general-purpose processors such as CPUs or machine learning or artificial intelligence accelerators with specialized parallel processing capabilities. These other types of processors may not be configured to execute graphics instructions or perform graphics operations. For example, other types of processors may not include fixed-function hardware that is included in typical GPUs. Machine learning accelerators may include specialized hardware for certain operations such as implementing neural network layers or other aspects of machine learning models. Speaking generally, there may be design tradeoffs between the memory requirements, computation capabilities, power consumption, and programmability of machine learning accelerators. Therefore, different implementations may focus on different performance goals. Developers may select from among multiple potential hardware targets for a given machine learning application, e.g., from among generic processors, GPUs, and different specialized machine learning accelerators.

Overview of Work Distribution and Logical Slots

Figure 2:
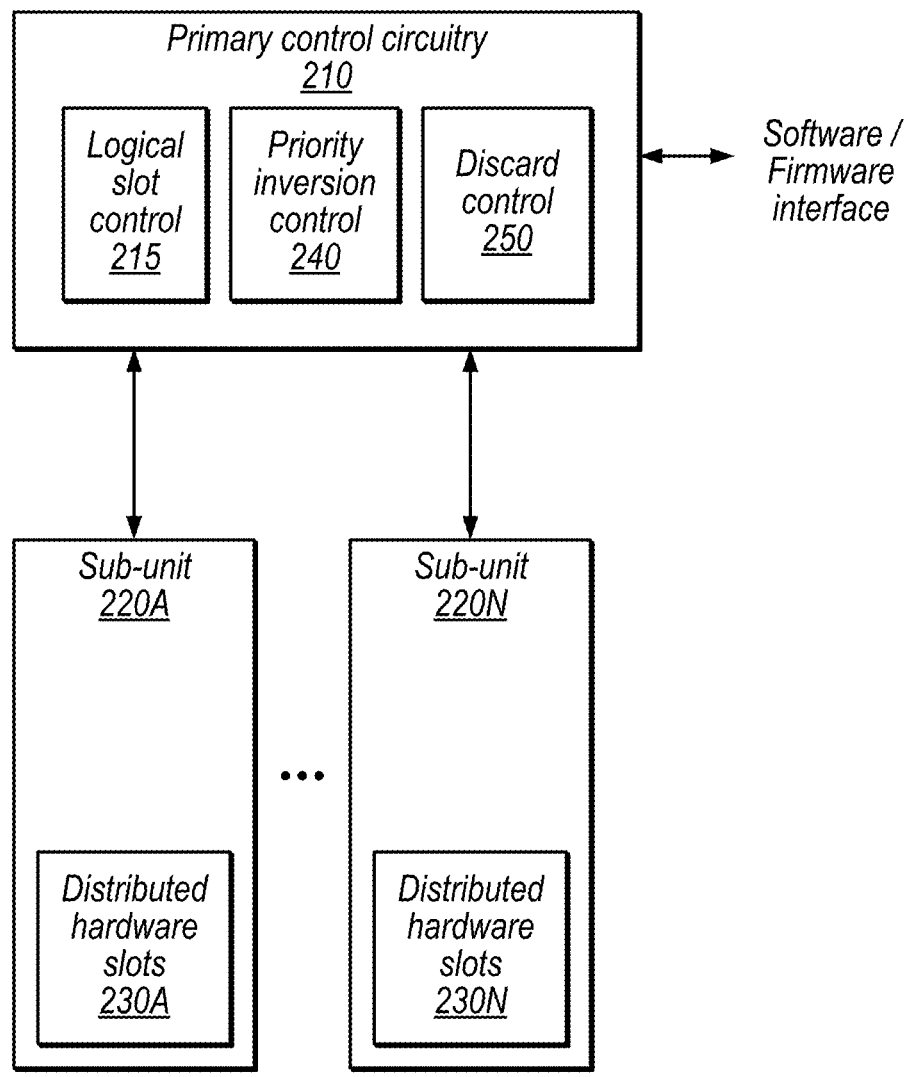
FIG. 2 is a block diagram illustrating example primary control circuitry configured to map logical slots to distributed hardware slots, according to some embodiments.

FIG. 2 is a block diagram illustrating example primary control circuitry and graphics processor sub-units, according to some embodiments. In the illustrated embodiment, a graphics processor includes primary control circuitry 210 and sub-units 220A-220N. Primary control circuitry 210, in turn, includes logical slot control circuitry 215, priority inversions control circuitry 240, and discard control circuitry 250. Sub-units 220A-220N, in turn, include distributed hardware slots 230A-230N.

Primary control circuitry 210 may be a compute data master, vertex data master, or pixel data master, for example. Therefore, in some embodiments, a graphics processor includes multiple instances of primary control circuitry 210 which send different types of work to the same set of sub-units. Primary control circuitry 210 may receive kicks via an interface from software, firmware, or both. As used herein, the term "software" broadly refers to executable program instructions and encompasses firmware, operating systems, and third-party applications, for example. Therefore, it should be understood that various references to software herein may apply alternatively or additionally to firmware. Logical slot control circuitry 215, in the illustrated embodiment, may distribute work from logical slots (which may be referred to as "kickslots") to distributed hardware slots on all or a portion of the graphics processor (e.g., according to different distribution modes discussed below with reference to FIG. 4).

Various circuitry is described herein as controlling logical slots. The term "logical" means that assignment of work to the logical slot does not imply which hardware will actually execute the graphics instructions of the assigned work. The control circuitry may include hardware that maintains information for a logical slot and assigns work from the logical slot to hardware slots for actual execution. Thus, upon initial assignment to a logical slot, the hardware slots that will execute the set of work is not known. As discussed in detail below, logical slots may provide various advantages in terms of performance and power consumption when scheduling graphics work, particularly in a graphics processor with multiple shader cores.

Sub-units 220, in some embodiments, are scaling units that may be replicated to increase the processing capabilities of a GPU. Each GPU sub-unit 220 may be capable of independently processing instructions of a graphics program. Sub-units 220, in the illustrated embodiment, include circuitry that implements respective distributed hardware slots 230. These hardware slots may also be referred to herein as "dSlots." Each sub-unit may include multiple hardware slots 230. Sub-units may also be referred to herein as "mGPUs." In some embodiments, primary control circuitry 210 assigns work from a logical slot to at most one distributed hardware slot in each sub-unit 220. In some embodiments, each sub-unit includes fragment generator circuitry, shader core circuitry configured to execute shader programs, memory system circuitry (which may include one or more caches and a memory management unit), geometry processing circuitry, and distributed workload distribution circuitry (which may coordinate with primary control circuitry 210 to distribute work to shader pipelines).

Each distributed hardware slot may include various circuitry configured to process an assigned kick or portion thereof, including configuration registers, a work queue, circuitry configured to iterate through work in the queue (e.g., batches of compute workitems), circuitry to sequence context loads/stores, and work distribution tracking circuitry. Each sub-unit 220 may include multiple shaders that accept work from distributed slots in the sub-unit and use pipelines to execute the work. For example, each shader may include a queue for each distributed hardware slot and may select work from among the queues based on work priority.

In some embodiments, a given sub-unit 220 includes multiple programmable shaders 160 of FIG. 1.

As discussed in detail below, logical slot control circuitry 215 may distribute kicks across sub-units 220 based on various parameters, software control inputs, etc.

Priority inversion control circuitry 240, in some embodiments, is configured to generate signaling (e.g., an interrupt) in response to detecting priority inversion. U.S. patent application Ser. No. 17/468,328 filed Sep. 7, 2021 is incorporated herein by reference in its entirety and discusses logical kickslot techniques and techniques for detecting and signaling priority inversion scenarios.

Discard control circuitry 250, in some embodiments, is configured to control discarding of lower priority work based on a signal received from software (e.g., as generated by the graphics driver in response to a priority inversion interrupt, an out-of-memory interrupt, or a context switch taking longer than a threshold interval to complete). In traditional systems, software may need to wait for all kicks running on geometry hardware to complete or to context switch out active kicks. This may cause long wait times before higher-priority kicks can be launched (e.g., while waiting for pending work to drain).

In disclosed embodiments, software may use a discard feature to discard work from a lower-priority kick in various situations, e.g., when it takes more than a threshold number of cycles to context save, to unblock a context switch save that was interrupted by an out-of-memory event, or to handle out-of-memory events in modes with a fixed maximum parameter buffer size (where the parameter buffer may be a list of pages filled by geometry processing outputs). A detailed sequence for discarding and/or killing work is discussed below with reference to FIGS. 4 and 5.

Figure 3:
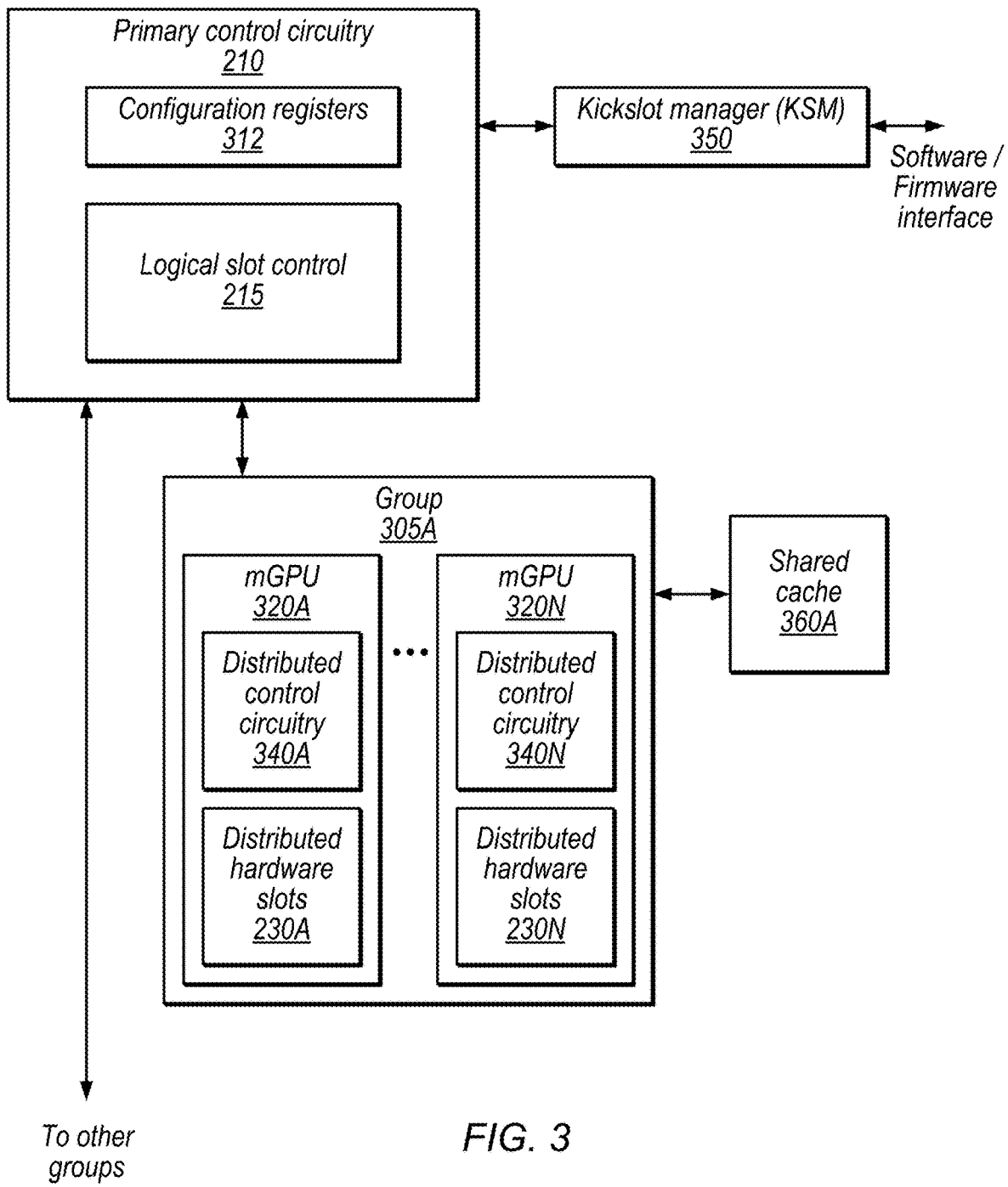
FIG. 3 is a block diagram illustrating primary control circuitry and example groups of GPU hardware sub-units, according to some embodiments.

FIG. 3 is a block diagram illustrating a more detailed example of primary control circuitry and grouped processor sub-units, according to some embodiments. In the illustrated embodiment, primary control circuitry 210 communicates with a kickslot manager (KSM) 350 and includes configuration registers 312. These configuration registers may include both setup and execution registers. Setup phase registers may be global structures that are agnostic of distributed hardware used to execute a kick while execute registers may be per sub-unit structures. Generally, although shown in primary control circuitry 210, configuration registers may be included in various appropriate circuitry (e.g., in distributed control circuitry 340) and may have different scopes (e.g., some registers may be boot scoped, some associated with a logical slot, and some associated with a distributed slot). Some configuration registers may be shared and program the same values into both global and per sub-unit register circuitry. Configuration registers data may be stored in memory in a defined format and retrieved and unpacked to populate physical configuration registers for a given kick.

In the illustrated embodiment, mGPUs 320A-320N are grouped and primary control circuitry 210 communicates with multiple such groups. mGPUs are an example of sub-units 220. Each group of mGPUs 305, in the illustrated embodiment, shares a cache 360. This may be a level 2 cache, e.g., in embodiments in which each mGPU 320 maintains a level 1 cache. This shared cache may be used to store instructions, data, or both. In some embodiments, each group of mGPUs 305 is implemented on the same die or semiconductor substrate, e.g., in multi-die implementations.

Each mGPU 320, in the illustrated embodiment, includes distributed control circuitry which may receive work from primary control circuitry 210, assign work within the mGPU, and report work completion back to primary control circuitry 210 (e.g., via a communications fabric). Signals assigning work may not include the actual instructions to perform or data to be operated on, but may identify the location of program instructions to be executed.

Kickslot manager 350, in the illustrated embodiment, is configured to receive kicks from the software/firmware interface and communicate kicks to primary control circuitry 210 for assignment to logical slots.

Overview of Distributed Geometry Processing and Page Management

Figure 4:
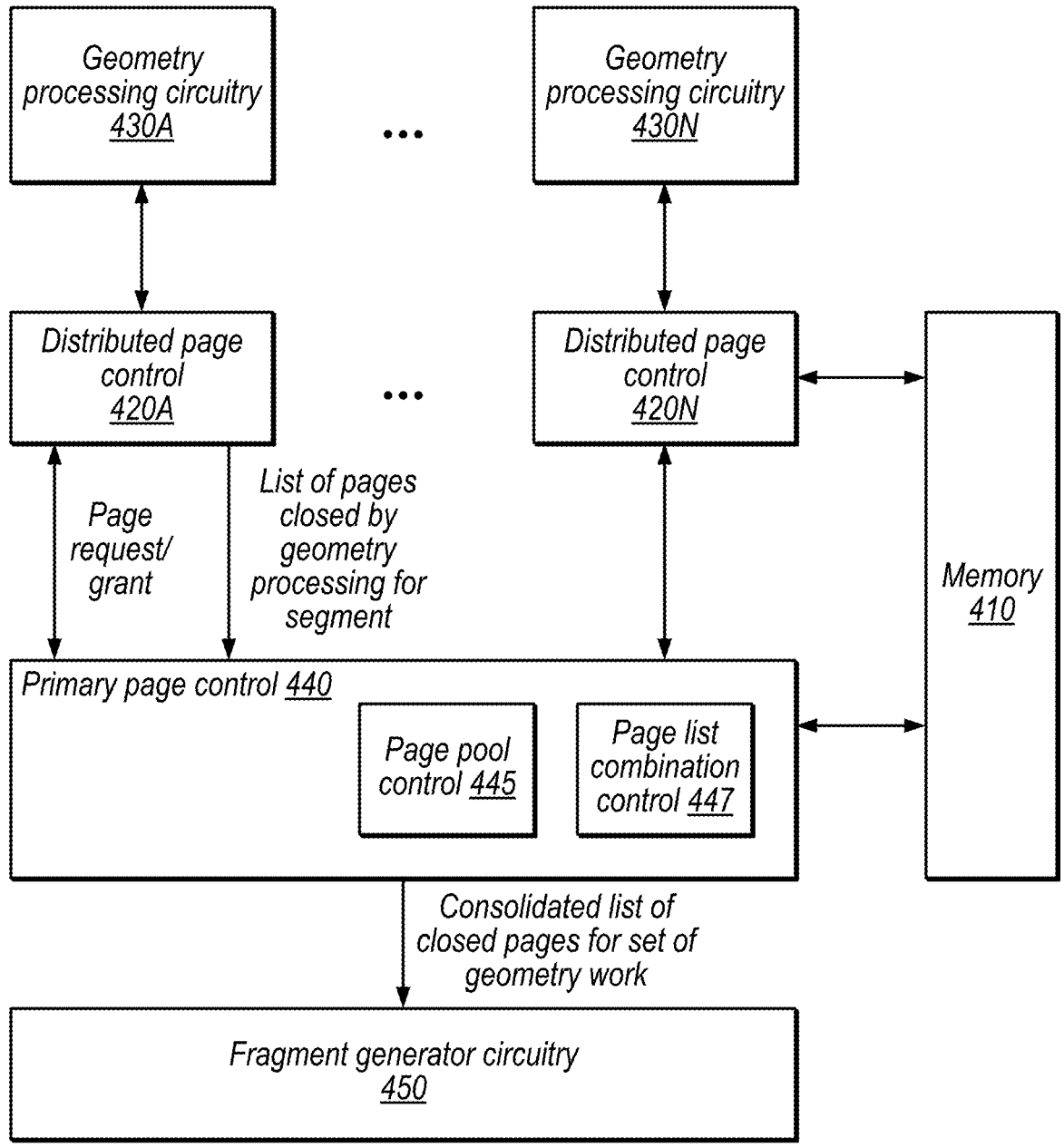
FIG. 4 is a block diagram illustrating example primary and distributed page management control circuitry configured to discard geometry work, according to some embodiments.

FIG. 4 is block diagram illustrating example distributed and primary control circuitry, according to some embodiments. In the illustrated embodiment, a graphics processor includes memory 410, distributed page control circuitry 420A-420N, geometry processing circuitry 430A-430N, primary page control circuitry 440, and fragment generator circuitry 450.

Geometry processing circuitry 430, in some embodiments, is included in multiple different GPU sub-units (which may be referred to as mGPUs). In some embodiments, control circuitry may distribute segments of a given geometry kick for processing by multiple different mGPUs. Geometry processing circuitry 430 may include fixed-function hardware and may also launch vertex shaders or may launch object shaders and mesh shaders, for example, on shader processors.

In some embodiments, a segment launched by vertex data control circuitry on an mGPU is assigned a segment ID in a sequential fashion and this segment ID defines the age of the segment. Each of the segments may start, finish and, in general, work independently of each other. Additional kick segments may be launched as and when a geometry pipeline becomes available. This distributed processing of kick segments may advantageously improve performance relative to traditional geometry processing techniques, particularly for large kicks or when there are substantial dependencies between kicks.

Distributed page control circuits 420, in some embodiments, are configured to interact with primary page control circuitry 440 to procure pages from a page pool for geometry processing, e.g., via the illustrated page request/grant interface. In some embodiments, distributed control circuitry is implemented for each geometry pipeline (e.g., for each instance of geometry processing circuitry 430), one or more of which may be included on each mGPU. The distributed page control circuits 420 may interact with geometry processing circuitry 430 to allocate pages for geometry processing output and close pages that are complete. When a distributed page control circuit 420 is finished with assigned work for a segment, it may send a halt-page-credits signal to primary page control 440 to begin end-of-kick operations.

Distributed page control circuitry 420 may also create and maintain a list of closed pages for a given segment being processed by its corresponding geometry processing circuitry 430. The closed pages may be filled with output data from geometry work (e.g., to be consumed by a fragment kick). Distributed page control circuits 420 may also procure pages from a page pool to store the list itself. In some embodiments, the list is a linked list, which may be referred to as a linked list of closed pages (LLCP). As shown, a given distributed page control circuit 420 may provide its list of closed pages for a segment to primary page control circuitry 440.

Primary page control circuitry 440, in some embodiments, is configured to manage the page pool in memory 410, e.g., using page pool control circuitry 445, which may route requested pages to the appropriate distributed page control circuit 420. Primary page control circuitry 440 may maintain a list of free pages that are available for grant.

Page list combination control circuitry 447, in the illustrated embodiment, is configured to stitch the lists of closed pages for different segments of a given multi-segment geometry kick to generate a consolidated list of closed pages for the set of geometry work. It provides the consolidated list to fragment generator circuitry 450, which may traverse the list and deallocate pages as they are consumed. Note that the list may be stored in memory 410, a cache of primary page control circuitry 440, or both. Therefore, primary page control circuitry 440 may provide the list directly (e.g., from a cache) or indirectly (e.g., via memory 410) to fragment generator circuitry 450.

In some embodiments, combination control 447 is configured to stitch lists for up to N segments at a time, and these segments may be referred to as a stitch set. In some embodiments, combination control 447 maintains a segment-id-mask, a seg-start pointer, and a seg-end pointer. The segment-id-mask may track segments that have completed processing on geometry processing circuitry 430 and are ready for stitching. The seg-start pointer may point to the segment ID from which the next stitch operation should start and the seg-end pointer may refer to the last segment for the stitch set. In some embodiments, when a stitch operation is completed, combination control 447 communicates the seg-end pointer to the vertex data controller, e.g., so that it can re-use those segment IDs to launch new work. In some embodiments, a stitch set is not stitched until all of its segments are ready and the stitching circuitry does not move to the next stitch set until the current set is stitched.

U.S. patent application Ser. No. 17/805,607, filed Jun. 6, 2022 is incorporated by reference herein in its entirety and discusses techniques for page control and stitching of segment LLCPs from a segmented geometry kick.

Detailed Example Discard Sequence

Figure 5:
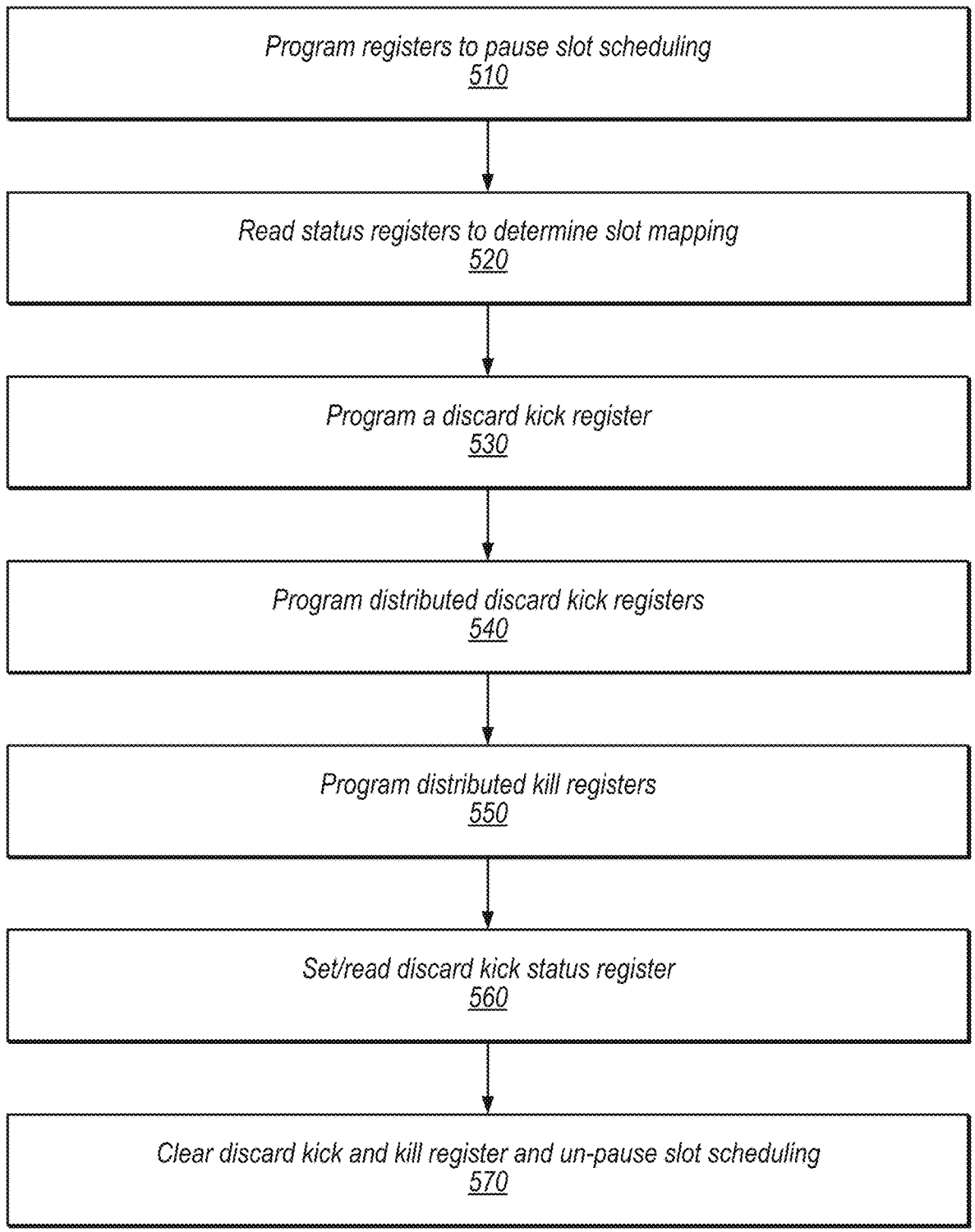
FIG. 5 is a flow diagram illustrating a detailed example handshake procedure for a discard sequence, according to some embodiments.

FIG. 5 is a flow diagram illustrating a detailed example discard sequence, according to some embodiments. In some embodiments, the following programming sequence may be used to kill/discard lower-priority work. Note that the example sequence below is included for purposes of illustration, but other sequences may be implemented in other embodiments. In some embodiments, discard control circuitry 250 performs various operations discussed below, which may include actions by primary page control 440.

At 510, in the illustrated example, software programs registers to pause tracking slot to logical slot scheduling in kickslot manager 350 and logical slot to distributed slot scheduling in primary control circuitry 210. This may prevent the mapping from changing while kill/discard registers are programmed. Note that this pause may not prevent distributed slots from finishing work that is already assigned, but may prevent assignment of another kick to those resources.

At 520, in the illustrated example, software reads status registers in kickslot manager 350 to determine the tracking slot to logical slot to distributed slot mapping for the top slot to be killed.

At 530, in the illustrated example, software programs a discard kick register for a logical slot in page control circuitry 440 such that the control circuitry will free closed pages from a linked-list of closed pages (LLCP) to a list of free pages. Note that page control circuitry 440 may not need to provide dummy pages, which may be provided by distributed control circuitry 420 as discussed below. Firmware may provide a valid virtual page address through the same control register.

At 540, in the illustrated example, software programs discard kick registers in applicable mGPUs (that have hardware slots assigned to the kick being discarded) such that distributed control circuitry 420 provides a dummy page to the kick and frees pages from segmented lists of closed pages back to the free list. The dummy page may not need to be freed by control circuitry (e.g., it may not be part of the page pool but may be directly allocated by the driver, which may re-claim and de-allocate the page back to the operating system once the kick ends).

At 550, in the illustrated example, software programs kill registers in applicable mGPUs to kill any active shader work and cull remaining geometry in geometry processing circuitry 430.

At 560, in the illustrated example, if primary page control 440 worked on discarding a kick, it sets a discard kick status register. If the kick completed before control circuitry 440 was notified to discard, the status register may indicate that the kick completed via the status register.

When the kick ends, software reads the discard kick status register to determine whether the kick was killed and discarded.

At 570, in the illustrated example, firmware clears discard kick registers and kill registers and un-pauses tracking slot to logical slot and logical slot to distributed slot scheduling. The disclosed sequence may avoid the kill register being programmed before discard registers so that the kill operation does not complete before software is able to program discard registers.

Note that software may also de-queue any kick that depends on the kick being discarded before programming a discard register. A discarded kick may be started from the beginning (in contrast to initiating a context switch resume in cases where a context switch was successful without discard/kill).

Primary page control 440 and distributed page control circuits 420 may be in various states when their discard register is programmed, such as: making progress in hardware, already finished, and out-of-memory. In the "making progress" state, circuitry 440 and relevant distributed circuitry 420 may perform the discard operation discussed herein and may set a status register to indicate that they worked on the discarded kick. In the "already-finished" state, circuitry 440 and 420 may terminate the kick normally rather than using the discard procedure. In the "out-of-memory" state, circuitry 440 may suppress an out-of-memory interrupt and give precedence to the discard operation.

Example Techniques for Handling Different Segment States

In various embodiments, a geometry kick may be divided into multiple segments, which may be processed independently (and potentially in parallel). As discussed above, outputs from segment processing may be stitched before being provided as input to a fragment kick. Generally, hardware may be responsible for properly discarding all the segments of a segmented kick.

In the discard/kill context, segments may be in various different states when discarded. A given segment may be in one of the following states: incomplete segment, completed segment, stitched segments, and new segments.

An incomplete segment may imply that primary page control 440 has not received a halt-page-credits command from a distributed page control circuit 420 for the segment (if circuitry 420 has received a kick terminate command, it will issue the halt-page-credits command, potentially with a hint bit at a particular value so that primary page control 440 knows it can treat the segment as a completed segment).

If a distributed page control circuit 420 has not received a kick terminate signal, it may put itself into a discard mode of operation, which may include: issuing discard pages in response to allocation requests, issuing fast-free-page commands to closed pages that do not match the discard page, reading pages from a segmented LLCP and sending them back to a free list (e.g., a page pool) via primary page control 440, freeing pages in a pre-fetch FIFO, and ending the segment (e.g., sending halt-page-credits with a hint bit that indicates the segment was discarded).

A completed segment implies that the segment has already issued a halt-page credits command but has not yet been stitched. Primary page control 440 may wait for the segment to issue a kick terminate command (which indicates the segmented LLCP has been flushed and fenced), reads the LLCP entries, and writes them back to the free list.

For stitched segments, circuitry 440 may wait for any active stitching operations to complete, then reads LLCP entries pointed to by the stitched list and writes them back to the free list. For segments that terminated but were not stitched, circuitry 440 may read the entries from the segmented bases and write them to the free list. Once discard-related operations are complete, circuitry 440 may send a stitch-done for the last segment back to control circuitry 210.

New segments refers to a case where a kick-start comment for a segment is received at circuitry 440 after its discard register has been programmed. The kick may be handled as an incomplete segment, in this case.

Therefore, speaking generally, circuitry 440 may drop discard operations for logical slots that are no longer active, wait for stitching to complete if active and prevent initiating of further stitch operations, reads stitched LLCP data and frees pages, checks hint bits for corresponding segments that were terminated but not stitched and frees those pages, and sends a stitch done signal for the last segment ID. In some embodiments, circuitry 440 is configured to perform disclosed operations for multiple logical slots at the same time.

Example Page Deallocation Management for Discarding Geometry Work

Figure 6:
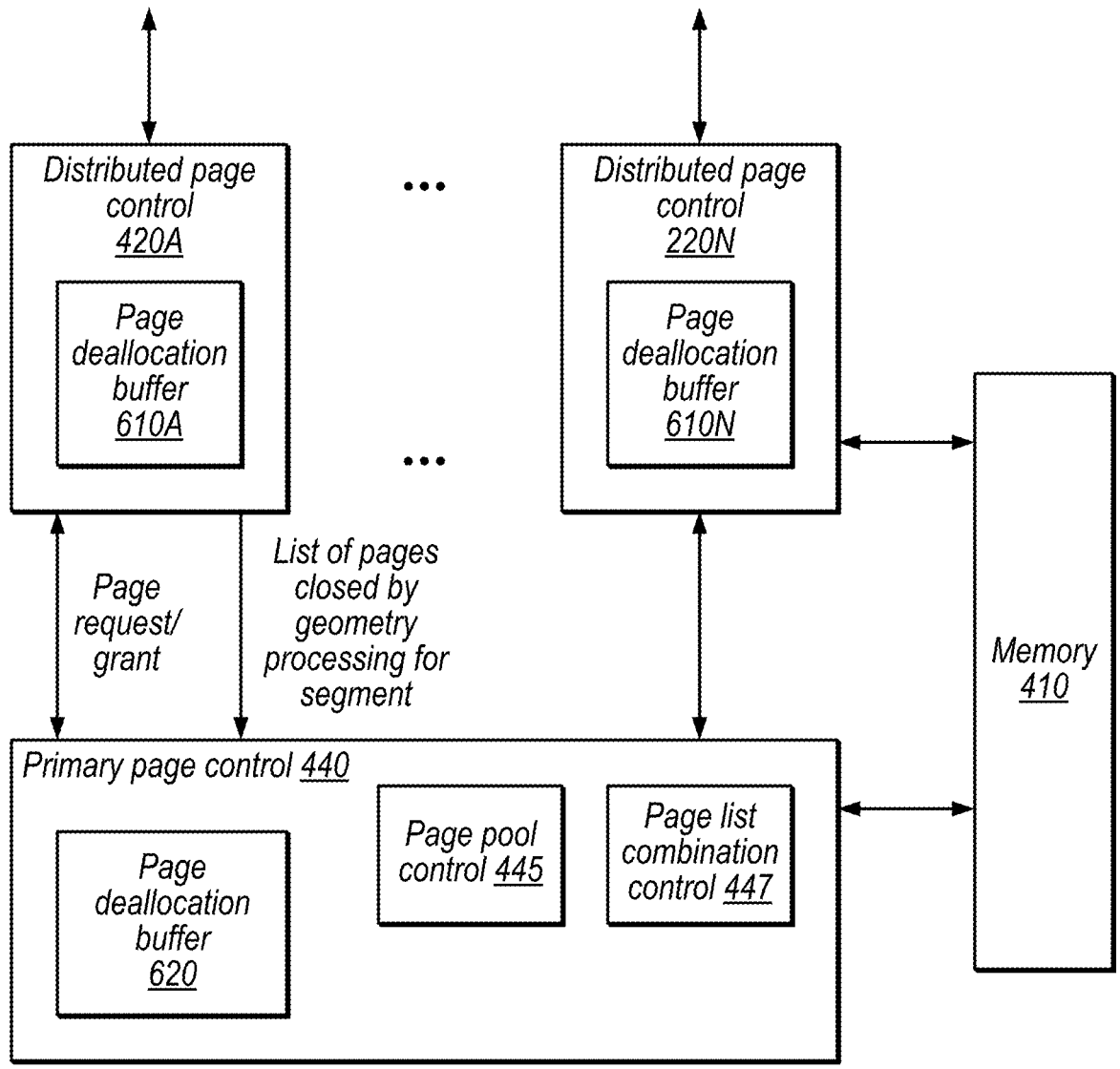
FIG. 6 is a block diagram illustrating example page deallocation buffers, according to some embodiments.

FIG. 6 is a block diagram illustrating example page deallocation buffers, according to some embodiments. Note that similarly numbered elements of FIG. 6 may be configured as discussed above with reference to FIG. 4. In addition, the circuitry of FIG. 6 includes page deallocation buffers 610A-610N and 620.

In some embodiments, pages that have been closed after being written with outputs of geometry work may be indicated in deallocation buffers until they are freed. In some embodiments, primary slot tracking circuitry in primary page control 440 tracks the state of a discarded kick until it terminates. Incomplete segments associated with a primary slot are discarded using the deallocation buffers (including a stitched LLCP and any segment LLCPs that terminated and have not been stitched). The deallocation buffers may be shared between logical slots and arbitration circuitry may select a given logical slot to use the buffers before opening the buffers and deallocation logic for use by another logical slot.

Example Priority Inversion Register Information

Figure 7:
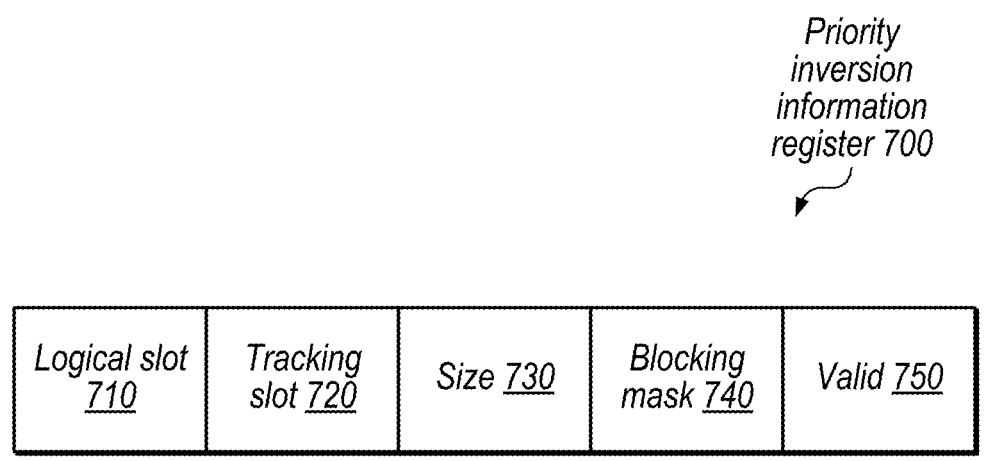
FIG. 7 is a diagram illustrating example register fields for priority inversion information, according to some embodiments.

FIG. 7 is a block diagram illustrating an example software-accessible register that hardware may configure in conjunction with a priority inversion interrupt to provide information about lower-priority blocking work, according to some embodiments.

In the illustrated example, register 700 includes the following fields: logical slot 710, tracking slot 720, size 730, blocking mask 740, and valid 750.

Logical slot field 710, in some embodiments, indicates the logical slot of the kick that is blocking higher-priority work.

Tracking slot field 720, in some embodiments, indicates the tracking slot of the kick that is blocking higher-priority work. Note that software may be able to obtain the tracking slot based on the logical slot (and vice versa), so one of these fields may be omitted in some embodiments. But, including both fields may avoid an access to kickslot manager 350 to determine this mapping.

Size field 730, in some embodiments, indicates the number of distributed hardware slots targeted by the higher-priority kick that is blocked (e.g., a slot in a single mGPU, slots in all mGPUs, or some number of slots in between).

Blocking mask field 740, in some embodiments, indicates which distributed hardware slots are blocking the higher-priority kick. Note that this may range from a single slot to all of the of the distributed slots used by the blocking, lower-priority kick.

Valid field 750, in some embodiments, indicates whether the blockage has been resolved. For example, if the lower-priority kick terminates normally before software takes action based on the priority inversion interrupt, valid field 750 may reflect this situation and software may determine to ignore the interrupt.

Example Method

Figure 8:
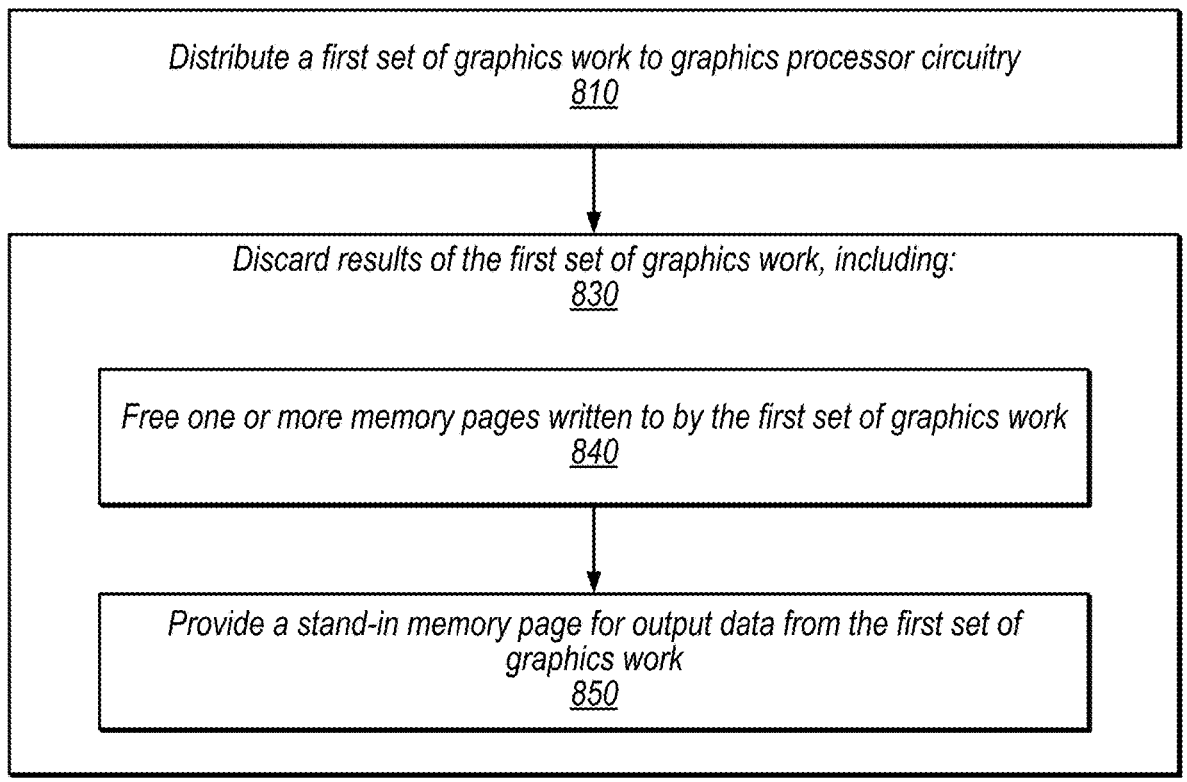
FIG. 8 is a flow diagram illustrating an example method, according to some embodiments.

FIG. 8 is a flow diagram illustrating an example method for discarding graphics work, according to some embodiments. The method shown in FIG. 8 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 810, in the illustrated embodiment, a computing device distributes a first set of graphics work to graphics processor circuitry. For example, the computing device may map a geometry kick to a logical slot and map the logical slot to multiple distributed slots.

In some embodiments, the computing device initiates a priority inversion signal in response to a determination that a second set of graphics work has a higher priority than the first set of graphics work and is blocked by the first set of graphics work.

In some embodiments, control circuitry includes a software-visible storage element that indicates the first set of graphics work that is blocking the second set of graphics work. In some embodiments, the storage element indicates: a logical slot of the first set of graphics work, a number of distributed hardware slots targeted by the second set of graphics work, a mask that indicates distributed hardware slots blocking the second set of graphics work, and a valid field that indicates whether the blockage has been resolved.

At 830, in the illustrated embodiment, the computing device discards, in response to a discard signal, results of the first set of graphics work. In the illustrated embodiment, this includes elements 840 and 850.

The discard signal may be initiated based on the priority inversion signal. The discard signal may be based on an out-of-memory condition, e.g., signaled by an out-of-memory interrupt. The discard signal may be based on a context switch taking too long (e.g., more than a threshold time interval).

In some embodiments, the computing device halts slot manager circuitry from allocating distributed hardware slots to logical slots, which may allow software to query a static state of current logical slot to distributed hardware slot mappings.

At 840, in the illustrated embodiment, the computing device frees one or more memory pages written to by the first set of graphics work. This may include adding pages to a list of free pages, adding pages to a page pool of available pages, etc.

In some embodiments, page manager circuitry is configured to maintain a list of available pages for the geometry processor circuitry and a list of closed pages that have been written by the geometry processor circuitry.

At 850, in the illustrated embodiment, the computing device provides a stand-in memory page for output data from the first set of graphics work. In some embodiments, the stand-in memory page prevents an out-of-memory condition for the first set of graphics work. In some embodiments, control circuitry is configured to provide the same stand-in memory page multiple times for output data from the first set of graphics work and free the stand-in memory page after use.

In some embodiments, the computing device includes shader processing circuitry configured to execute the first set of graphics work and kills work executing on the shader processor circuitry in response to a kill signal (e.g., using cull circuitry to cull at least a portion of the work).

In some embodiments, control circuitry is configured to, in response to determining that multiple portions of the vertex processing work have completed (e.g., all segments of a kick), stitch output pages for the multiple portions of the vertex processing work instead of discarding results.

In some embodiments, the discard of element 830 operates according to the following sequence of operations: software executed by the apparatus pauses assignment of distributed hardware slots to logical slots, software reads status information to determine a current mapping of distributed hardware slots to logical slots, software configures primary discard information indicating one or more logical slots to receive dummy pages and have their pages freed, software configures distributed discard information for distributed hardware slots being discarded, software configures a kill indication to kill geometry work in the geometry processor circuitry, control circuitry sets a discard status indication if it discarded the first set of graphics work, software reads the discard status indication, and software un-pauses assignment of distributed hardware slots to logical slots.

In some embodiments, control circuitry includes: distributed control circuitry in different graphics processor sub-units and primary control circuitry configured to communicate with the distributed control circuitry. The distributed control circuitry and primary control circuitry may include deallocation buffers configured to store deallocated memory pages to be freed.

Example Device

Figure 9:
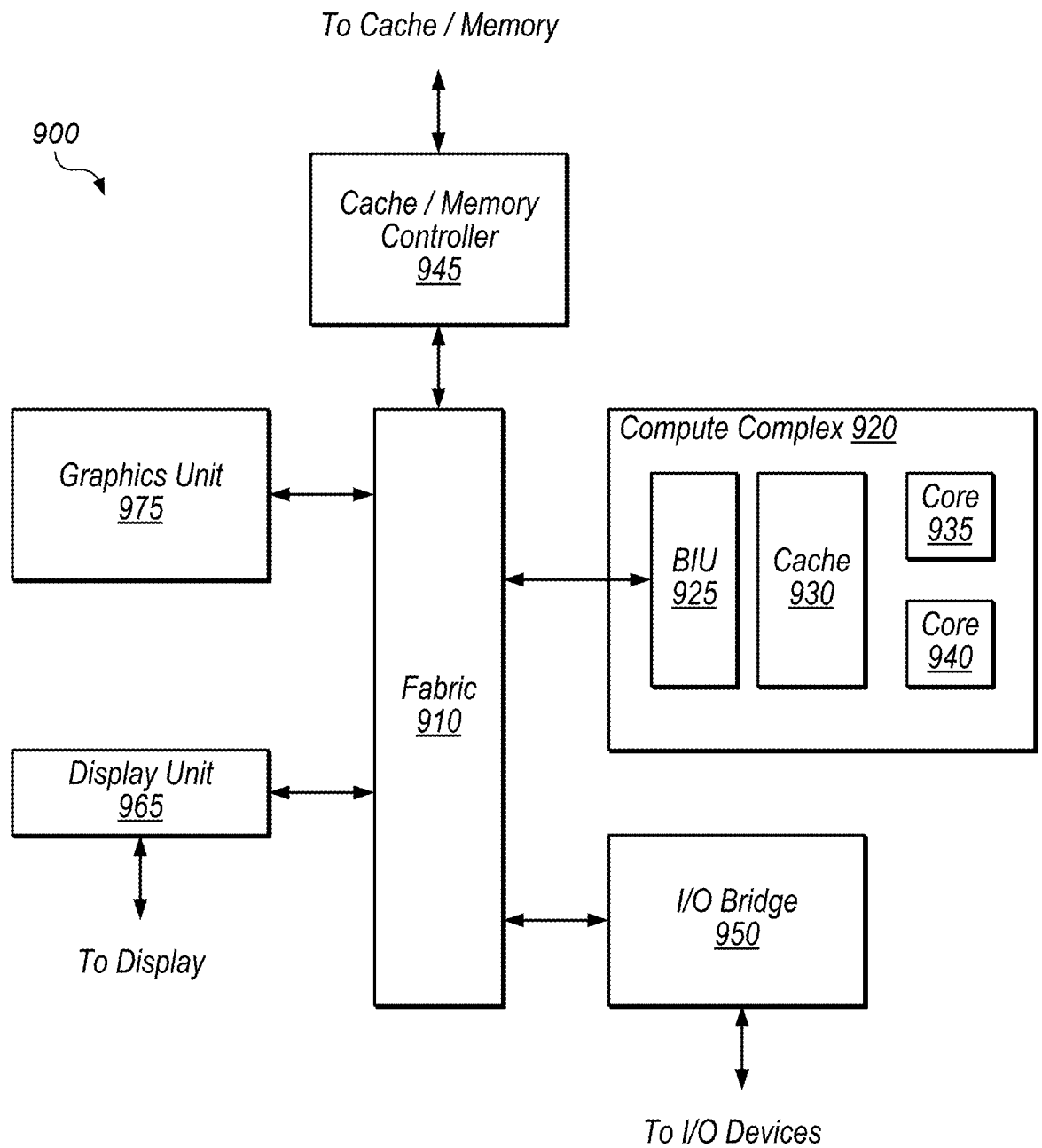
FIG. 9 is a block diagram illustrating an example computing device, according to some embodiments.

Referring now to FIG. 9, a block diagram illustrating an example embodiment of a device 900 is shown. In some embodiments, elements of device 900 may be included within a system on a chip. In some embodiments, device 900 may be included in a mobile device, which may be battery-powered. Therefore, power consumption by device 900 may be an important design consideration. In the illustrated embodiment, device 900 includes fabric 910, compute complex 920 input/output (I/O) bridge 950, cache/memory controller 945, graphics unit 975, and display unit 965. In some embodiments, device 900 may include other components (not shown) in addition to or in place of the illustrated components, such as video processor encoders and decoders, image processing or recognition elements, computer vision elements, etc.

Fabric 910 may include various interconnects, buses, MUX's, controllers, etc., and may be configured to facilitate communication between various elements of device 900. In some embodiments, portions of fabric 910 may be configured to implement various different communication protocols. In other embodiments, fabric 910 may implement a single communication protocol and elements coupled to fabric 910 may convert from the single communication protocol to other communication protocols internally.

In the illustrated embodiment, compute complex 920 includes bus interface unit (BIU) 925, cache 930, and cores 935 and 940. In various embodiments, compute complex 920 may include various numbers of processors, processor cores and caches. For example, compute complex 920 may include 1, 2, or 4 processor cores, or any other suitable number. In one embodiment, cache 930 is a set associative L2 cache. In some embodiments, cores 935 and 940 may include internal instruction and data caches. In some embodiments, a coherency unit (not shown) in fabric 910, cache 930, or elsewhere in device 900 may be configured to maintain coherency between various caches of device 900. BIU 925 may be configured to manage communication between compute complex 920 and other elements of device 900. Processor cores such as cores 935 and 940 may be configured to execute instructions of a particular instruction set architecture (ISA) which may include operating system instructions and user application instructions.

Cache/memory controller 945 may be configured to manage transfer of data between fabric 910 and one or more caches and memories. For example, cache/memory controller 945 may be coupled to an L3 cache, which may in turn be coupled to a system memory. In other embodiments, cache/memory controller 945 may be directly coupled to a memory. In some embodiments, cache/memory controller 945 may include one or more internal caches.

As used herein, the term "coupled to" may indicate one or more connections between elements, and a coupling may include intervening elements. For example, in FIG. 9, graphics unit 975 may be described as "coupled to" a memory through fabric 910 and cache/memory controller 945. In contrast, in the illustrated embodiment of FIG. 9, graphics unit 975 is "directly coupled" to fabric 910 because there are no intervening elements.

Graphics unit 975 may include one or more processors, e.g., one or more graphics processing units (GPU's). Graphics unit 975 may receive graphics-oriented instructions, such as OPENGL®, Metal, or DIRECT3D® instructions, for example. Graphics unit 975 may execute specialized GPU instructions or perform other operations based on the received graphics-oriented instructions. Graphics unit 975 may generally be configured to process large blocks of data in parallel and may build images in a frame buffer for output to a display, which may be included in the device or may be a separate device. Graphics unit 975 may include transform, lighting, triangle, and rendering engines in one or more graphics processing pipelines. Graphics unit 975 may output pixel information for display images. Graphics unit 975, in various embodiments, may include programmable shader circuitry which may include highly parallel execution cores configured to execute graphics programs, which may include pixel tasks, vertex tasks, and compute tasks (which may or may not be graphics-related).

In some embodiments, graphics unit 975 implements disclosed techniques for discarding/killing graphics work in priority inversion situations, which may improve performance. Improving graphics performance may improve user experience, e.g., by reducing dropped frames, increasing frame rate for a given workload, etc.

Display unit 965 may be configured to read data from a frame buffer and provide a stream of pixel values for display. Display unit 965 may be configured as a display pipeline in some embodiments. Additionally, display unit 965 may be configured to blend multiple frames to produce an output frame. Further, display unit 965 may include one or more interfaces (e.g., MIPI® or embedded display port (eDP)) for coupling to a user display (e.g., a touchscreen or an external display).

I/O bridge 950 may include various elements configured to implement: universal serial bus (USB) communications, security, audio, and low-power always-on functionality, for example. I/O bridge 950 may also include interfaces such as pulse-width modulation (PWM), general-purpose input/output (GPIO), serial peripheral interface (SPI), and inter-integrated circuit (I2C), for example. Various types of peripherals and devices may be coupled to device 900 via I/O bridge 950.

In some embodiments, device 900 includes network interface circuitry (not explicitly shown), which may be connected to fabric 910 or I/O bridge 950. The network interface circuitry may be configured to communicate via various networks, which may be wired, wireless, or both. For example, the network interface circuitry may be configured to communicate via a wired local area network, a wireless local area network (e.g., via WiFi), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth or WiFi Direct), etc. In various embodiments, the network interface circuitry may provide device 900 with connectivity to various types of other devices and networks.

Example Applications

Figure 10:
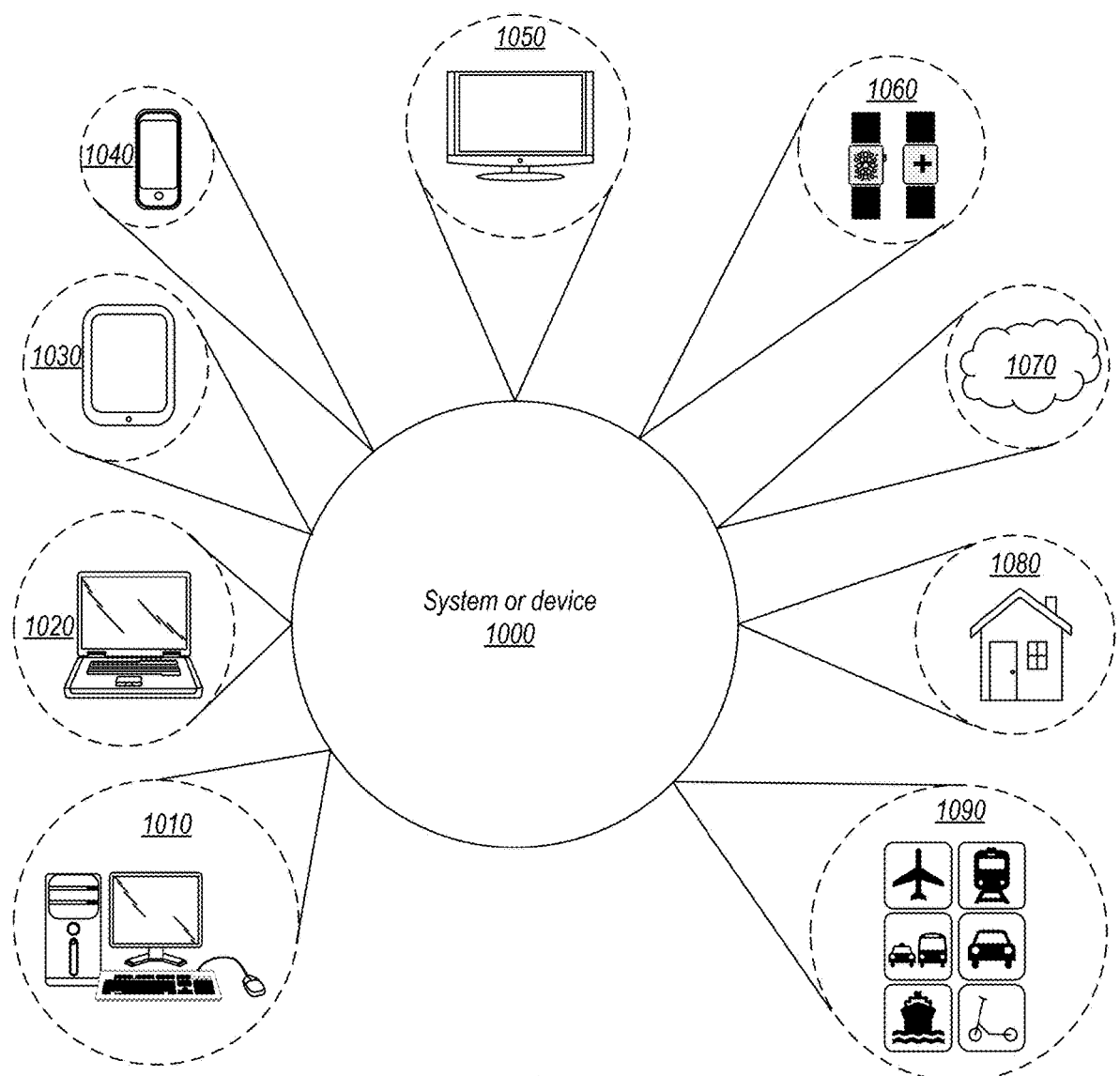
FIG. 10 is a diagram illustrating example applications of disclosed systems and devices, according to some embodiments.

Turning now to FIG. 10, various types of systems that may include any of the circuits, devices, or system discussed above. System or device 1000, which may incorporate or otherwise utilize one or more of the techniques described herein, may be utilized in a wide range of areas. For example, system or device 1000 may be utilized as part of the hardware of systems such as a desktop computer 1010, laptop computer 1020, tablet computer 1030, cellular or mobile phone 1040, or television 1050 (or set-top box coupled to a television).

Similarly, disclosed elements may be utilized in a wearable device 1060, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 1000 may also be used in various other contexts. For example, system or device 1000 may be utilized in the context of a server computer system, such as a dedicated server or on shared hardware that implements a cloud-based service 1070. Still further, system or device 1000 may be implemented in a wide range of specialized everyday devices, including devices 1080 commonly found in the home such as refrigerators, thermostats, security cameras, etc. The interconnection of such devices is often referred to as the "Internet of Things" (IoT). Elements may also be implemented in various modes of transportation. For example, system or device 1000 could be employed in the control systems, guidance systems, entertainment systems, etc. of various types of vehicles 1090.

The applications illustrated in FIG. 10 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 11:
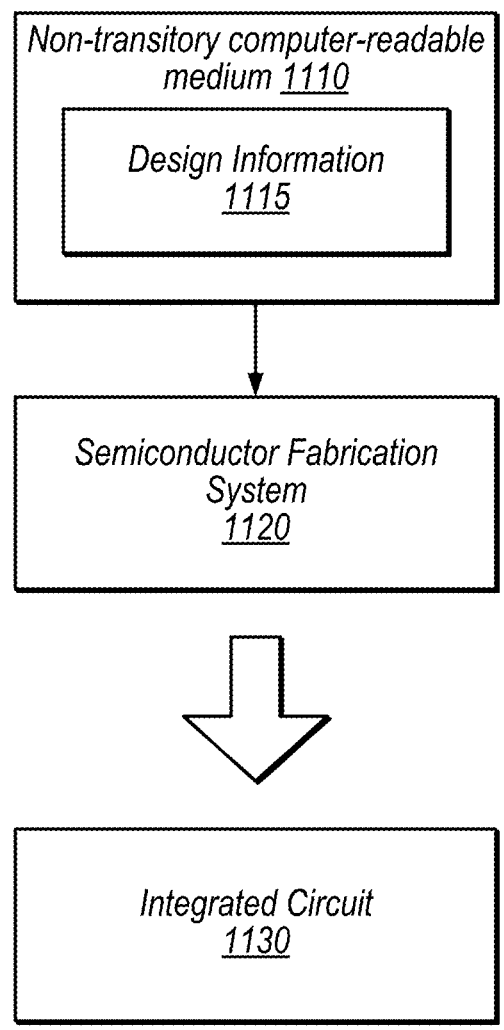
FIG. 11 is a block diagram illustrating an example computer-readable medium that stores circuit design information, according to some embodiments.

FIG. 11 is a block diagram illustrating an example non-transitory computer-readable storage medium that stores circuit design information, according to some embodiments. In the illustrated embodiment semiconductor fabrication system 1120 is configured to process the design information 1115 stored on non-transitory computer-readable medium 1110 and fabricate integrated circuit 1130 based on the design information 1115.

Non-transitory computer-readable storage medium 1110, may comprise any of various appropriate types of memory devices or storage devices. Non-transitory computer-readable storage medium 1110 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1110 may include other types of non-transitory memory as well or combinations thereof. Non-transitory computer-readable storage medium 1110 may include two or more memory mediums which may reside in different locations, e.g., in different computer systems that are connected over a network.

Design information 1115 may be specified using any of various appropriate computer languages, including hardware description languages such as, without limitation: VHDL, Verilog, SystemC, System Verilog, RHDL, M, MyHDL, etc. Design information 1115 may be usable by semiconductor fabrication system 1120 to fabricate at least a portion of integrated circuit 1130. The format of design information 1115 may be recognized by at least one semiconductor fabrication system 1120. In some embodiments, design information 1115 may also include one or more cell libraries which specify the synthesis, layout, or both of integrated circuit 1130. In some embodiments, the design information is specified in whole or in part in the form of a netlist that specifies cell library elements and their connectivity. Design information 1115, taken alone, may or may not include sufficient information for fabrication of a corresponding integrated circuit. For example, design information 1115 may specify the circuit elements to be fabricated but not their physical layout. In this case, design information 1115 may need to be combined with layout information to actually fabricate the specified circuitry.

Integrated circuit 1130 may, in various embodiments, include one or more custom macrocells, such as memories, analog or mixed-signal circuits, and the like. In such cases, design information 1115 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 1120 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1120 may also be configured to perform various testing of fabricated circuits for correct operation.

In various embodiments, integrated circuit 1130 is configured to operate according to a circuit design specified by design information 1115, which may include performing any of the functionality described herein. For example, integrated circuit 1130 may include any of various elements shown in FIGS. 1B-6 and 9. Further, integrated circuit 1130 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:
a set of graphics processor sub-units; and
control circuitry configured to:
distribute a first set of graphics work to the graphics processor sub-units; and
in response to a discard signal, discard results of the first set of graphics work, including to:
free one or more memory pages that include data written during execution of the first set of graphics work; and
provide a stand-in memory page for output data from the first set of graphics work, wherein one or more of the graphics processor sub-units of the set are configured to execute one or more instructions of the first set of graphics work, after the discard signal, to write output data to the stand-in memory page.

2. The apparatus of claim 1, wherein the discard signal is asserted based on at least one condition from the following set of conditions:
a context switch operation exceeding a threshold time interval; and
an out of memory signal generated by the control circuitry.

3. The apparatus of claim 1, wherein the control circuitry is further configured to:
initiate a priority inversion signal in response to a determination that a second set of graphics work has a higher priority than the first set of graphics work and is blocked by the first set of graphics work, wherein the discard signal is generated based on the priority inversion signal.

4. The apparatus of claim 1, wherein the apparatus includes:
circuitry that implements a plurality of logical slots;
wherein the set of graphics processor sub-units each implement multiple distributed hardware slots; and
wherein the control circuitry is configured to assign the first set of graphics work to a first logical slot and map the first logical slot to distributed hardware slots in different sub-units.

5. The apparatus of claim 4, wherein the control circuitry is further configured to halt slot manager circuitry from allocating distributed hardware slots to logical slots, thereby allowing software to query a static state of current logical slot to distributed hardware slot mappings.

6. The apparatus of claim 1, wherein:
the first set of graphics work includes vertex processing work;
the graphics processor sub-units include geometry processor circuitry configured to control the vertex processing work; and
the control circuitry includes page manager circuitry configured to allocate pages for outputs of the vertex processing work for rasterization and input to fragment shader work.

7. The apparatus of claim 6, wherein the stand-in memory page prevents an out-of-memory condition for the first set of graphics work.

8. The apparatus of claim 7, wherein the control circuitry is configured to provide the same stand-in memory page multiple times for output data from the first set of graphics work and free the stand-in memory page after use.

9. The apparatus of claim 6, wherein:
the apparatus further comprises shader processor circuitry configured to execute the first set of graphics work; and
the control circuitry is configured to kill work executing on the shader processor circuitry in response to a kill signal.

10. The apparatus of claim 9, wherein to kill work executing on the shader processor circuitry, the control circuitry is configured to use cull circuitry to cull at least a portion of the work.

11. The apparatus of claim 6, wherein the page manager circuitry is configured to maintain a list of available pages for the geometry processor circuitry and a list of closed pages that have been written by the geometry processor circuitry.

12. The apparatus of claim 6, wherein the control circuitry is configured to, in response to determining that multiple portions of the vertex processing work have completed, stitch output pages for the multiple portions of the vertex processing work instead of discarding results.

13. The apparatus of claim 6, wherein the discard operates according to the following sequence of operations:
software executed by the apparatus pauses assignment of distributed hardware slots to logical slots;
software reads status information to determine a current mapping of distributed hardware slots to logical slots;
software configures primary discard information indicating one or more logical slots to receive dummy pages and have their pages freed;
software configures distributed discard information for distributed hardware slots being discarded;
software configures a kill indication to kill geometry work in the geometry processor circuitry;
the control circuitry sets a discard status indication if it discarded the first set of graphics work;
software reads the discard status indication; and
software un-pauses assignment of distributed hardware slots to logical slots.

14. The apparatus of claim 1, wherein the control circuitry includes:
distributed control circuitry in different graphics processor sub-units; and
primary control circuitry configured to communicate with the distributed control circuitry;
wherein the distributed control circuitry and primary control circuitry include deallocation buffers configured to store deallocated memory pages to be freed.

15. The apparatus of claim 1, wherein the control circuitry includes a software-visible storage element that indicates the first set of graphics work that is blocking a second, higher-priority set of graphics work.

16. The apparatus of claim 15, wherein the control circuitry is configured to indicate, via the storage element:
a logical slot of the first set of graphics work;
a number of distributed hardware slots targeted by the second set of graphics work;
a mask that indicates distributed hardware slots blocking the second set of graphics work; and
a valid field that indicates whether the blockage has been resolved.

17. A method, comprising:
a computing device:
distributing a first set of graphics work to graphics processor circuitry; and in response to a discard signal, discarding results of the first set of graphics work, including:
- freeing one or more memory pages that include data written during execution of the first set of graphics work; and
- providing a stand-in memory page for output data from the first set of graphics work, wherein the graphics processor circuitry executes one or more instructions of the first set of graphics work, after the discard signal, to write output data to the stand-in memory page.

18. The method of claim 17, further comprising:
in response to determining that multiple portions of the first set of graphics work have completed, the computing device stitching output pages for the multiple portions of the first set of graphics work instead of discarding results.

19. A non-transitory computer readable storage medium having stored thereon design information that specifies a design of at least a portion of a hardware integrated circuit in a format recognized by a semiconductor fabrication system that is configured to use the design information to produce the circuit according to the design, wherein the design information specifies that the circuit includes:
- a set of graphics processor sub-units; and
- control circuitry configured to:
  - distribute a first set of graphics work to the graphics processor sub-units; and
  - in response to a discard signal, discard results of the first set of graphics work, including to:
    - free one or more memory pages that include data written during execution of the first set of graphics work; and
    - provide a stand-in memory page for output data from the first set of graphics work, wherein one or more of the graphics processor sub-units of the set are configured to execute one or more instructions of the first set of graphics work, after the discard signal, to write output data to the stand-in memory page.

20. The non-transitory computer readable storage medium of claim 19, wherein:
- the first set of graphics work includes vertex processing work;
- the graphics processor sub-units include geometry processor circuitry configured to control the vertex processing work; and
- the control circuitry includes page manager circuitry configured to allocate pages for outputs of the vertex processing work for rasterization and input to fragment shader work.

* * * * *